(12) United States Patent
Kakiuchi et al.

(10) Patent No.: US 7,272,260 B1
(45) Date of Patent: Sep. 18, 2007

(54) IMAGE RECOGNITION-PROCESSING DEVICE AND METHOD USING PATTERN ELEMENTS

(75) Inventors: Takashi Kakiuchi, Kyoto (JP); Junji Hiraishi, Kyoto (JP); Keitaro Taniguchi, Kyoto (JP); Tomoji Kagatani, Kyoto (JP)

(73) Assignee: Omron Corporation (JP)

( * ) Notice: Subject to any disclaimer, the term of this patent is extended or adjusted under 35 U.S.C. 154(b) by 0 days.

(21) Appl. No.: 09/479,886

(22) Filed: Jan. 10, 2000

(30) Foreign Application Priority Data

Jan. 8, 1999 (JP) ............................... P11-002437

(51) Int. Cl.
*G06K 9/64* (2006.01)
*G06K 9/62* (2006.01)
*G06K 9/00* (2006.01)

(52) U.S. Cl. ........................ 382/217; 382/135; 382/209

(58) Field of Classification Search ................ 382/195, 382/205, 209, 215, 217–220, 112, 113, 135, 382/137; 399/366; 283/902
See application file for complete search history.

(56) References Cited

U.S. PATENT DOCUMENTS

| | | | | |
|---|---|---|---|---|
| 4,131,879 A | * | 12/1978 | Ehrat | 382/135 |
| 4,955,062 A | * | 9/1990 | Terui | 382/144 |
| 5,257,119 A | * | 10/1993 | Funada et al. | 358/438 |
| 5,583,614 A | * | 12/1996 | Hasuo et al. | 399/4 |
| 5,640,253 A | * | 6/1997 | Uchida et al. | 358/501 |
| 5,987,173 A | * | 11/1999 | Kohno et al. | 382/199 |
| 6,002,800 A | * | 12/1999 | Donelly et al. | 382/216 |
| 6,185,321 B1 | * | 2/2001 | Fukushima et al. | 382/135 |
| 6,370,271 B2 | * | 4/2002 | Fu et al. | 382/217 |
| 6,463,176 B1 | * | 10/2002 | Matsugu et al. | 382/195 |

FOREIGN PATENT DOCUMENTS

| | | |
|---|---|---|
| JP | 07-038737 | 2/1995 |
| JP | 09-259275 | 10/1997 |
| JP | 10-126614 | 5/1998 |
| JP | 10-150542 | 6/1998 |

OTHER PUBLICATIONS

Webster's Ninth New Collegiate Dictionary, Merriam-Webster, Inc., 1991, p. 99.*

* cited by examiner

*Primary Examiner*—Colin LaRose
(74) *Attorney, Agent, or Firm*—Dickstein Shapiro LLP (57) ABSTRACT

A image recognition device using pattern elements is disclosed. The device comprises an image recognition device, a recording medium, and an image processing device which is be capable of executing recognition processing accurately and evaluating an input image even when the input image data is a different size because the input image has been magnified or reduced. To achieve the objectives, the image recognition device of this invention has a pattern element recognizing means to recognize the pattern elements obtained by dividing the input image into a plurality of regions which are compared with corresponding target pattern elements, and a pattern detection means to detect the relative position of the pattern elements, which determines whether the pattern elements detected by the pattern element recognizing means are arranged properly with respect to each other.

27 Claims, 8 Drawing Sheets

TARGET PATTERN
(REFERENCE PATTERN) 5

6
INPUT PATTERN

IMAGE RECOGNITION-PROCESSING DEVICE AND METHOD USING PATTERN ELEMENTS

BACKGROUND OF THE INVENTION

I. Field of the Invention

This invention generally relates to a device and method to prevent the counterfeiting of paper money, stock certificates, or similar documents. More specifically, it relates to an image recognition device which is capable of recognizing a specific input image even though the input image has been enlarged or reduced in size.

II. Description of the Related Art

In recent years, the capabilities of full-color copy machines have become so sophisticated that it is often impossible to distinguish a copy from the original image with the naked eye. At the same time, such copying machines have become readily available. Thus, there is an increased danger that copiers will be misused to counterfeit documents, which may not legally be reproduced, such as banknotes and stock certificates. Various devices have been developed to prevent such counterfeiting.

Some of these devices pre-record a specific image of a banknote or other document, which may not be legally reproduced. Then, these devices determine whether the pre-recorded specific image exists in an input image which someone is attempting to copy. The method used to determine whether the image is recognized (i.e., pattern matching) entails evaluating the input image's distance from the template, or the relative correlation between a target pattern (the template) and the input image the device is attempting to recognize (the object of recognition).

If the device does recognize the target pattern in the input image, it employs any of various means to prevent copying, such as covering the paper entirely with black ink or halting the process.

Size is an essential element used in the technique described above. The size evaluation consists of determining if the input image and target pattern are exactly the same size. The input image and the target pattern must be the same size for the device to prevent copying. If the shapes in the two images are the same (i.e., the figures are similar) but their dimensions are different, the device will not recognize the input image as identical to the target pattern. As a result, if someone were to use the copier's zoom function to reduce or enlarge the input image to be copied, the size of the input image data, which the image recognition device received from the copier, would not match the target pattern stored in the device, and the device would conclude that the input image was not one for which copying should be prohibited.

A digital color copier normally reads the image loaded on the glass by moving an image sensor with one line of CCD (in the scanning direction) at a given speed. If the input image has been reduced or enlarged, the speed of the image sensor can be increased or decreased respectively. This is necessary because the quantity of data in the feed direction, which is received per unit of time, will differ with magnification.

It is understood that humans recognize shapes by a complex process. However, human are not as skilled in evaluating size. In fact, recognizing (or discriminating) small differences in size is difficult for most people. An item which is successfully copied because the image recognition device does not recognize the input image as the same size as the reference image may nevertheless be indistinguishable to the human eye.

If the magnification (either enlargement or reduction) is ten percent or more, anyone can easily recognize a copy by comparing it directly with the original bill or document and seeing that it is the wrong size; but seeing only the copy makes it much more difficult. Furthermore, if it is a bill which a person seldom sees, foreign currency for example, the task is even harder.

To address this problem, the image processing device disclosed in Japanese Patent Publication 6-237379 was developed. During preprocessing, this invention extracts a specified portion (which varies with the magnification) of the input image data based on the magnification it receives from the copier. This process makes the resolution of the extracted image data fixed at any magnification or zoom level. In this way the same processing can be executed in every subsequent unit without regard to the magnification, so that the likelihood of recognition will not vary with magnification.

The prior art device described above is effective for machines such as copiers which can transmit magnification or zoom data to it, but it cannot be used for machines which are unable to provide accurate magnification data. For example, an image processing system which consists of a scanner, a personal computer and a printer, inputs processes and reproduces the image by itself. This makes it difficult to obtain the sort of reliable index of magnification which a copier can readily provide. Thus, the recognition processing employing magnification disclosed in the Japanese Patent Publication 6-237379 cannot be applied to this sort of image processing system.

The rapid development of electronic technology has improved the resolution of all the devices discussed above and enabled accurate full color printing. For this reason we must have a reliable way to halt the reproduction of images containing specified target patterns.

SUMMARY OF THE INVENTION

The present invention provides an image recognition device, a recording medium, and an image processing device which are capable of executing recognition processing accurately and evaluating the input image even when the input image data and target pattern are different sizes due to magnification or reduction.

The preferred embodiment of this invention has a pattern element recognizing means to recognize the pattern elements obtained by dividing an input image into a plurality of regions which are compared with corresponding target pattern elements, and a pattern detection means to detect the relative position of the pattern elements, which determines whether the pattern elements detected by the pattern element recognizing means are arranged properly with respect to each other.

In another embodiment of the present invention, the device has a dictionary generating unit which stores dictionary data for each pattern element in the reference image; an element matching unit, which compares and matches the input image pattern data against the target pattern data stored in the dictionary unit; a storage unit for arrangement data (corresponding to "arrangement data generating unit 4"), which stores data representing the arrangement of the pattern elements; and a pattern detection unit, which based on the output of the element matching unit, determines whether the target pattern can be found in the input image data.

The image processing device of this invention executes specified image recognition processing on the input image data. After recognizing a match between the target pattern and the input image data being subject to the processing, by one of the above methods, this device prevents the normal image processing from occurring. In the preferred embodiment, this image processing device is realized by a personal computer 12. Any device other than a personal computer 12 which executes various image processing routines would also be considered an image processing device for the purpose of this invention, naturally including a copy machine. If used with an image processing device, such as a copier, which is capable of providing a magnification value, the device may employ the magnification value to establish the arrangement data which will serve as the basis for comparison, or it may establish the arrangement data without resorting to the magnification data from the copier.

The recording medium of this invention contains an image recognition program which sends commands to the computer to execute processing to match the input image data received against the dictionary data for each element in the pattern and processing to determine whether the arrangement of the pattern elements detected by the matching indicates the existence of the pattern.

The target pattern (i.e., dictionary data) used to recognize the specified image consists of pattern elements obtained by dividing the pattern into a number of regions. The specified image is recognized by matching the input image data against the dictionary data. By executing image recognition independently for a number of regions consisting of a small quantity of data (i.e., the pattern elements), we can minimize the effect of the discrepancy which shows up in each region due to the change in scale when the input image has been magnified or reduced.

If recognition is attempted using an entire pattern whose scale has been changed, the dimensional discrepancy (i.e., the discrepancy due to the number of elements) will be large, and the pattern will not be recognized. However, if recognition is executed on discrete pattern elements, the effect of the change in scale will be reduced, and the pattern can be recognized and detected.

Using smaller regions to mitigate the effects of magnification or reduction will cause the recognition rate to drop because false positives will be detected in images whose pattern elements could have been detected correctly regardless of scale; such false positives can be avoided by tying recognition to arrangement data. This will minimize the drop in recognition rate due to a slight change in scale.

BRIEF DESCRIPTION OF THE DRAWINGS

The foregoing and other advantages and features of the invention will become more apparent from the detailed description of preferred embodiments of the invention given below with reference to the accompanying drawings in which:

FIG. 3($a$) shows an example of how the specified reference image might be divided into pattern elements (dictionary data);

FIG. 3($b$) shows several examples of arrangement data;

FIG. 5($a$) illustrates a target pattern used for image recognition in FIG. 5($b$);

FIG. 5($b$) illustrates the difficulty experienced in the prior art, where the input image data is larger than the target (reference) pattern;

DETAILED DESCRIPTION OF PREFERRED EMBODIMENTS

Figure 1:
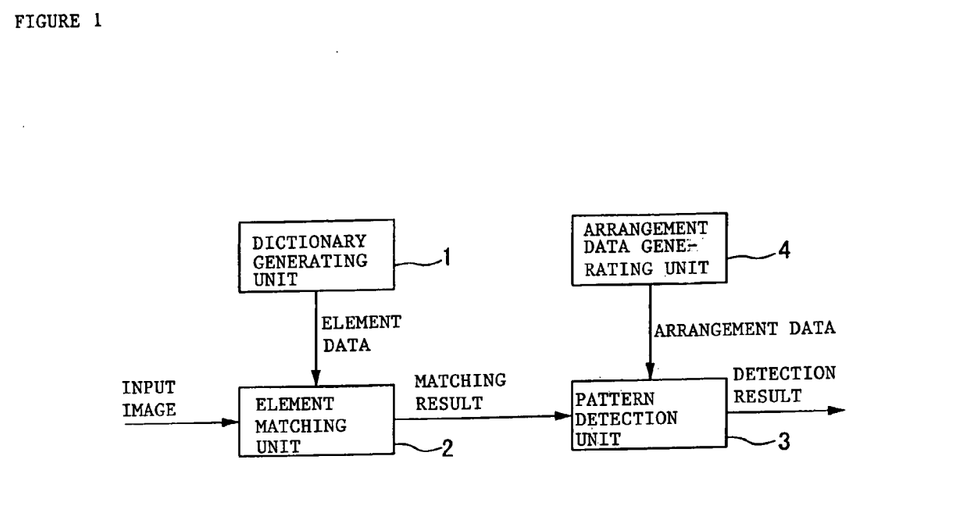
FIG. 1 is a block diagram of an image recognition device according to a preferred embodiment of the present invention.

Referring now to the drawings, where like reference numerals designate like elements, there is shown in FIG. 1 a device for image recognition using pattern elements. The device of FIG. 1 comprises a dictionary generating unit 1 which stores dictionary data concerning the target patterns to be detected. This dictionary data is obtained by dividing the target pattern (reference pattern) into a number of regions and storing each as a pattern element.

Figure 2:
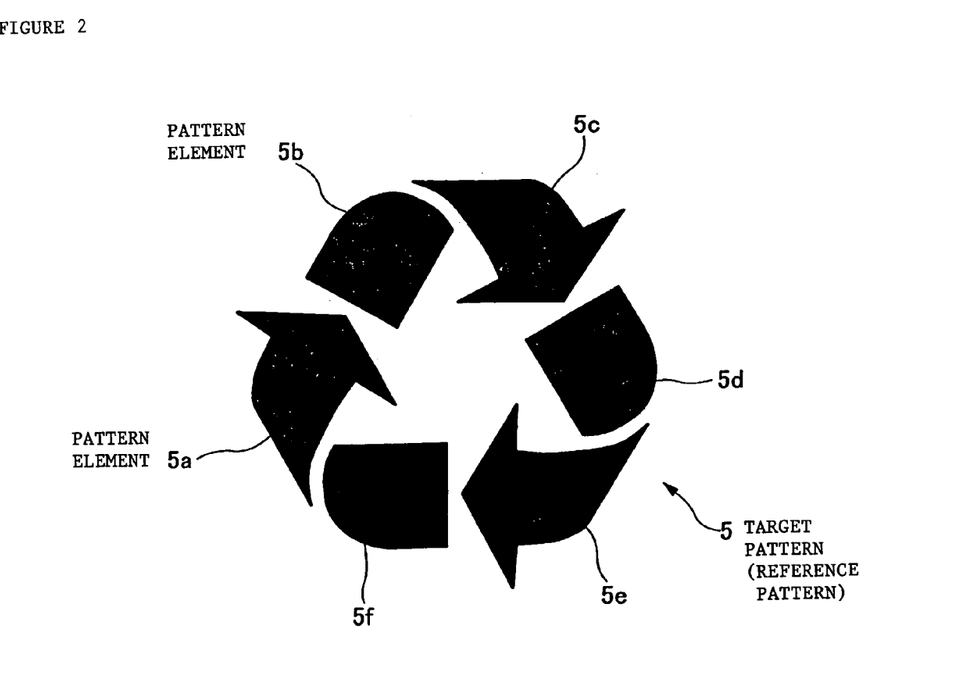
FIG. 2 shows an example of a target pattern (reference pattern) to be recognized.

For example, according to a prior art algorithm, the target pattern 5 shown in FIG. 2 would be recorded in the dictionary generating unit 1 as a target pattern in its entirety. With the present invention, the target pattern is divided into a number of (here, six) regions, and dictionary data for each region is stored as pattern elements 5$a$ through 5$f$.

Using the dictionary data stored in dictionary generating unit 1, element matching unit 2 executes matching processing on the input image. It sends the results of the matching to the next stage, pattern detection unit 3. For the dictionary data associated with the target pattern in FIG. 2, the six pattern elements 5$a$ through 5$f$ are read out (i.e., taken out of dictionary generating unit 1), and matching is executed with respect to each element. A determination is made as to whether the target pattern elements can be found in each input image. If they are found, the matching results are sent, together with their position data, to pattern detection unit 3. In this case the data consist of a set indicating which pattern element was found in which location.

In this embodiment, the location of the element consists of the coordinates of the center of the detected pattern element. In other words, element matching unit 2 also has the capacity to detect this center location. Since the processing by which the input image data is matched against the individual target pattern elements can be the same as that used in prior art devices, we will not provide a detailed explanation of it here.

Based on the matching results it receives from element matching unit 2 (the data as to the target pattern elements which match each of the input image pattern elements and the position data) and the arrangement data concerning target pattern elements 5$a$ through 5$f$ which it receives from arrangement data generating unit 4, pattern detection unit 3 determines whether the pattern elements in the input image, which match all of the target pattern elements, are in the proper locations. If they are, it concludes that the input image data that was received contains the target pattern, and it outputs the result that the target pattern has been recognized.

Figure 3A:
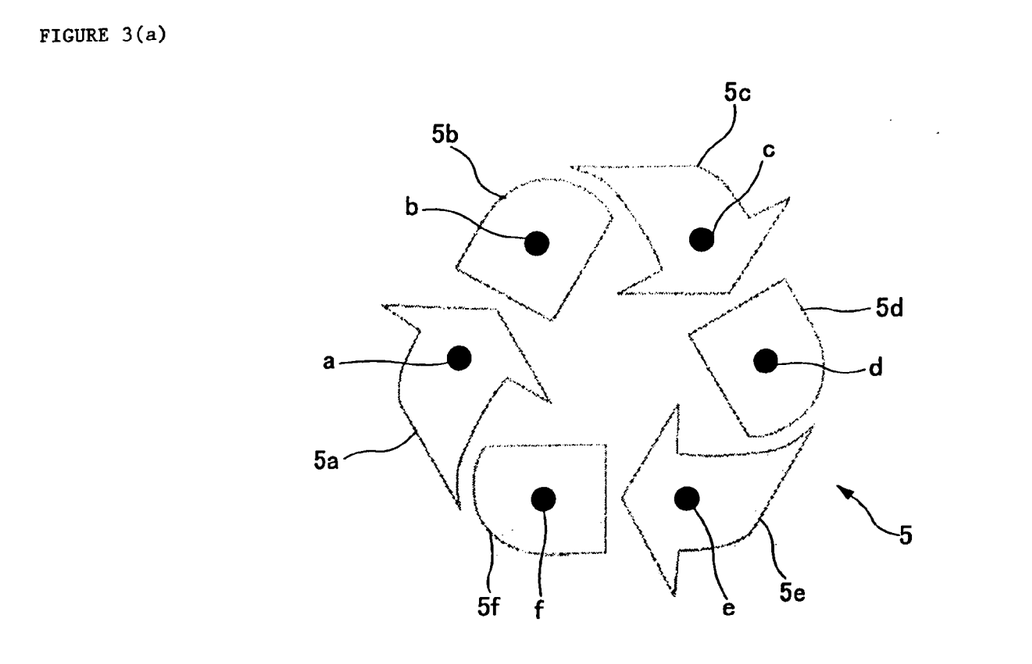
Figure 3B:
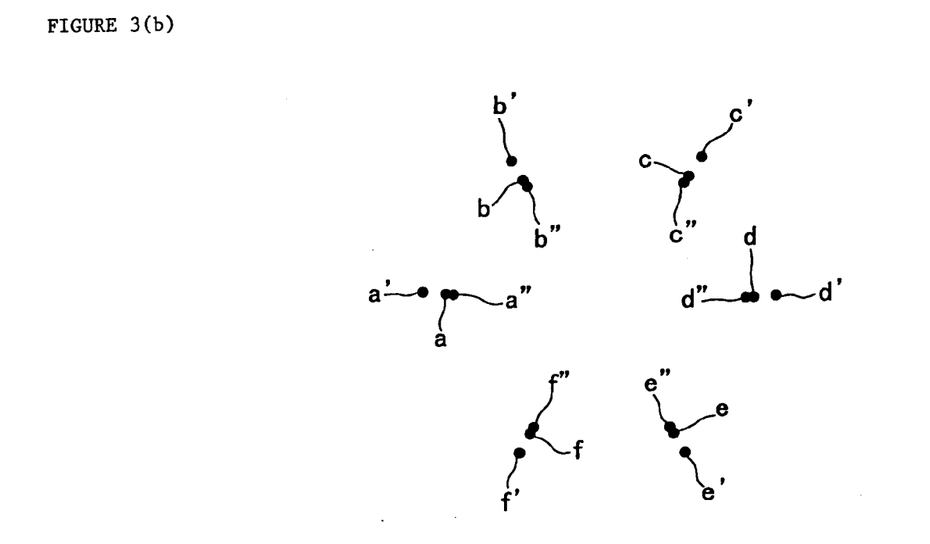

As can be seen in FIG. 3(a), the arrangement data stored in arrangement data generating unit 4 consists of the relative position coordinates which are defined by the center positions a through f of pattern elements 5a through 5f. The pattern shown in FIG. 3(a) is identical to pattern 5, which is to say that it represents the arrangement data for a magnification of 100%. However, the arrangement data in this embodiment is not limited to 100% only. Data for other magnifications are stored as well. As can be seen in FIG. 3(b), arrangement data for a magnification of 115% consists of the relative position coordinates of center points a' through f', and arrangement data for magnification of 95% consists of the relative position coordinates of center points a" through f".

Arrangement data generating unit 4 outputs a magnification which was previously estimated or inferred from the input image data along with the arrangement data for those elements. The magnification is estimated from the magnification of the object to be recognized. In actuality, a number of magnifications are provided as output sequentially. To infer the magnification based on the input image data, the technique disclosed in Japanese Patent Publication 9-132763 may be applied. If an accurate magnification value can be obtained from the exterior, as in the case of a copier, arrangement data appropriate for the given magnification is provided as output.

Figure 4:
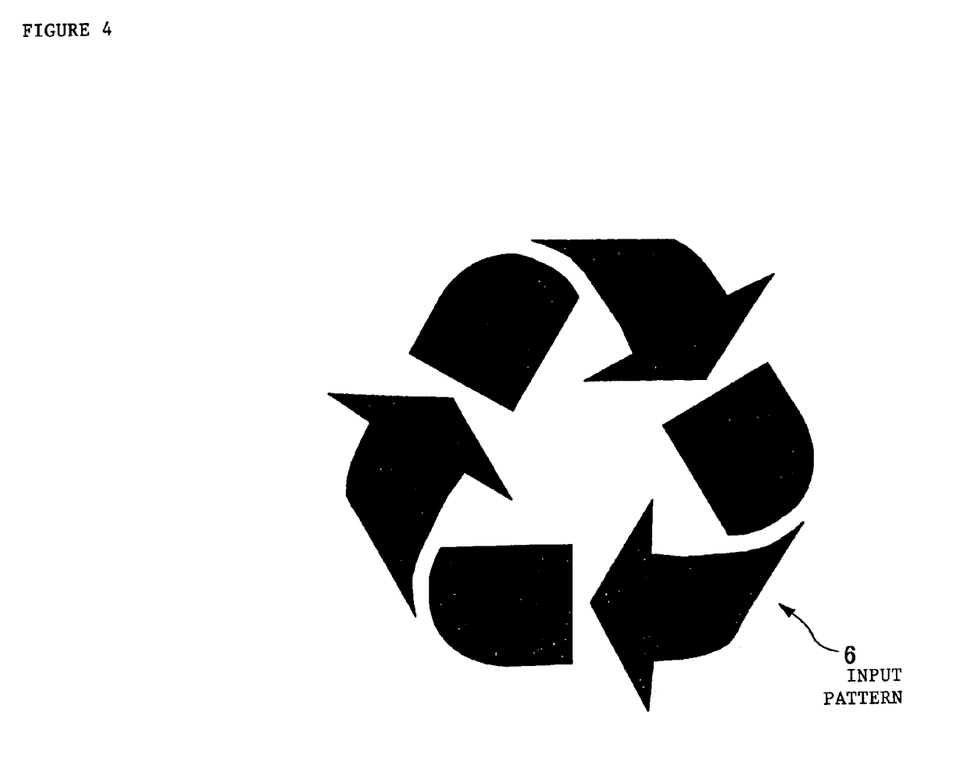
FIG. 4 shows an example of an input pattern to be compared with the target pattern.

We shall next give a more detailed explanation of this invention while discussing the actual recognition processing. If original pattern or target pattern 5 has the dimensions and shape shown in FIG. 2, let us assume that there is an input pattern 6 to be recognized, as shown in FIG. 4. Input pattern 6 has been magnified to 115% of the size of the original target pattern 5. With this small difference, there is a real possibility that a person viewing the input image pattern could mistakenly think it is identical to target pattern 5.

Figure 5A:
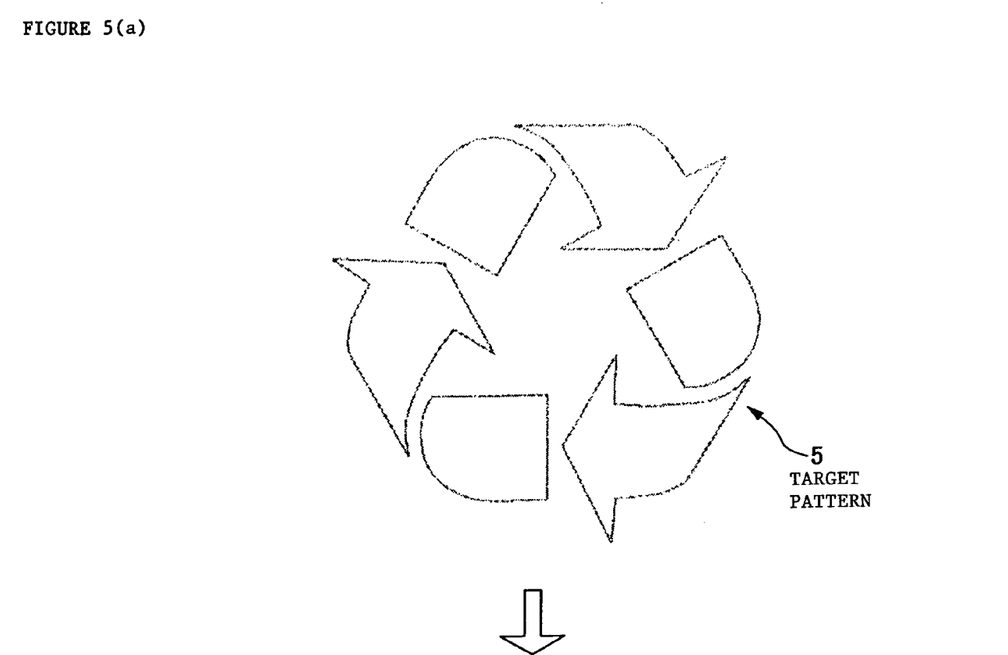
Figure 5B:
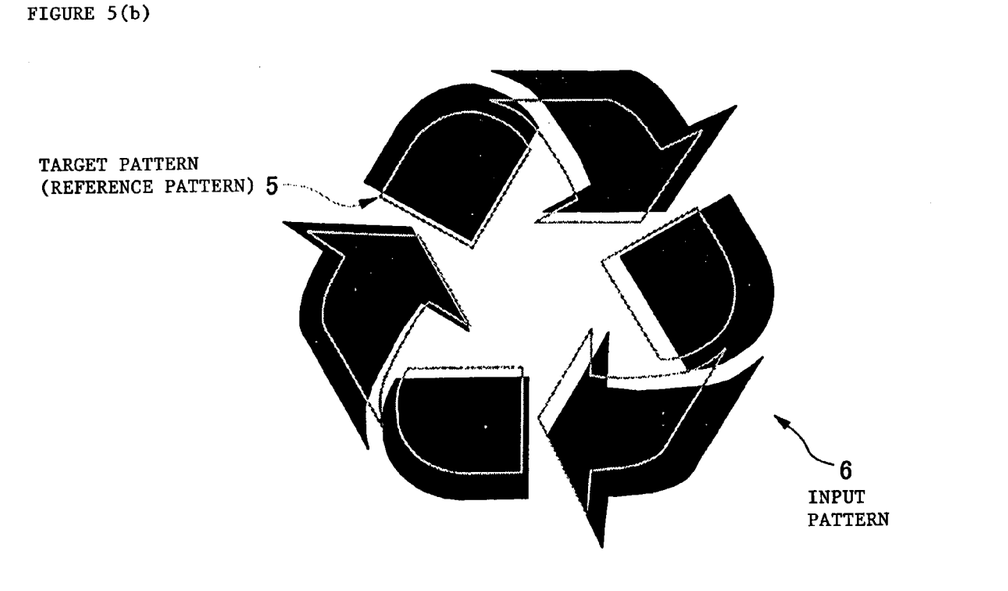

If a prior art image recognition method is used, the entire target pattern 5 in FIG. 2 will be used as a reference. When the target pattern 5, shown by dotted lines in FIG. 5(a), is matched against the actual input pattern 6, the size difference will cause a significant discrepancy (see FIG. 5(b)), the probability of receiving a positive image recognition (the matching value) will be low, and target pattern 5 will not be recognized in the input pattern 6.

Figure 6:
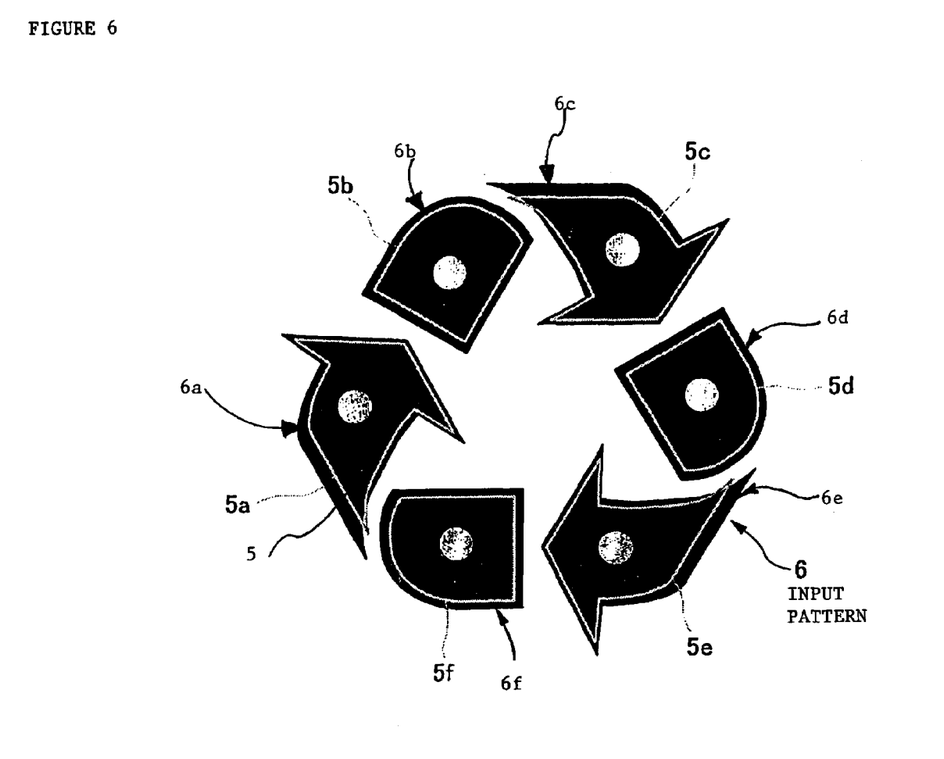
FIG. 6 illustrates image recognition in accordance with a preferred embodiment of the present invention.

With the current embodiment of the present invention, as can be seen in FIG. 6, each of the six target pattern elements 5a through 5f is compared to the corresponding input pattern element individually so that each is treated as a small independent region. The discrepancies caused by the magnification or reduction of the input image will for the most part be limited within a given input pattern element because the comparison is conducted in each region of the pattern elements. This regional comparison can result a sufficient accuracy in the matching process.

For example, in the example shown in FIG. 6, element matching unit 2 will detect all of input pattern elements 6a through 6f and extract the center coordinates (indicated by white circles in the drawing) for each element. It will then transmit these coordinate values along with a descriptive notation (a number) for each element to pattern detection unit 3 as the result of the recognition routine.

Pattern detection unit 3 compares the coordinate values sequentially with the plurality of reference arrangement data associated with each magnification which it receives from arrangement data generating unit 4. From this comparison, it determines whether the relative positional relationship of the input pattern elements that were detected matches the arrangement data for any of the magnifications, and so determines whether the input and target patterns match. In the example shown in FIG. 6, the relationship matches the arrangement data for a magnification of 115%, so it is determined that the detected input pattern matches the target pattern. A result indicating this match is output from pattern detection unit 3.

Resolution is one of the crucial elements in determining the presence of a pattern element. For example, when each comparison region is reduced for each input pattern element according to this embodiment, but elements 5a through 5f are changed to the higher resolution, then the detection can not be precisely carried out. This is because the total number of pixels in an image will increase or decrease according to the magnification ratio.

When one region of the image in target pattern 5 contains a square with 100 pixels in it, the input pattern magnified to 115% will have 115 pixels. The magnified input pattern of 115% will increase by 15 pixels. When that same target pattern 5 is divided into ten equal segments, each segment will contain a square consisting of 10 pixels. So even though the entire input pattern has been magnified to 115% of its original size, each input pattern element will consist of only 11.5 pixels, an increase of only one to two pixels. The input pattern elements can thus be detected in the target pattern elements almost without any effect from the magnification, thus ensuring that both matching and detection can be accomplished with acceptable accuracy.

However, if the target pattern of the actual dimensions is divided into ten equal regions and the resolution is increased by, for example, a factor of ten, each segment forming a pattern element will be a square containing 100 pixels. In this case, if the entire image is magnified to 115% of its original size, there will be fifteen extra pixels in each segment, and the accuracy of detection will suffer.

For this reason, the resolution of the pattern elements should be low enough such that no effect is experienced from a slight magnification. The discrepancy due to magnification should be kept within the range of accidental error in the input image. For our purposes, "slight magnification" refers to a low magnification which an ordinary person cannot discriminate or recognize with his naked eye. Magnification ratios large enough to distinguish with the naked eye need not be addressed. If the dimensions of the copy are obviously different from those of the original, so that a counterfeit banknote can easily be distinguished at a glance, there is no need for countermeasures.

With this sort of low resolution, the recognition rate with respect to individual pattern elements will not be high enough. In other word, patterns which are not pattern elements will mistakenly be recognized. (This is why we cannot lower the resolution of the entire pattern as a whole and match it directly against the entire pattern). This drop in the recognition rate can be offset by recognizing a number of regions (i.e., pattern elements) at the same time and by using arrangement data concerning their relative arrangement to aid in the recognition.

Figure 7:
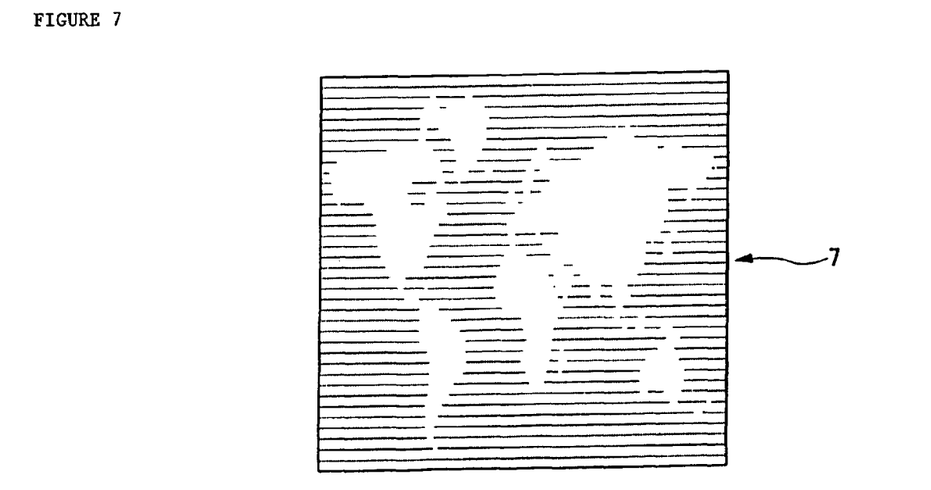
FIG. 7 shows another example of a target pattern to be recognized.

FIG. 7 shows another example of a pattern to be recognized. The pattern 5 shown in FIG. 2 consisted of a number of shapes, so it could easily be divided into elements; however, the invention is not limited to this sort of pattern only, but is also applicable for patterns like that shown in FIG. 7, which do not lend themselves easily to being divided.

Figure 8:
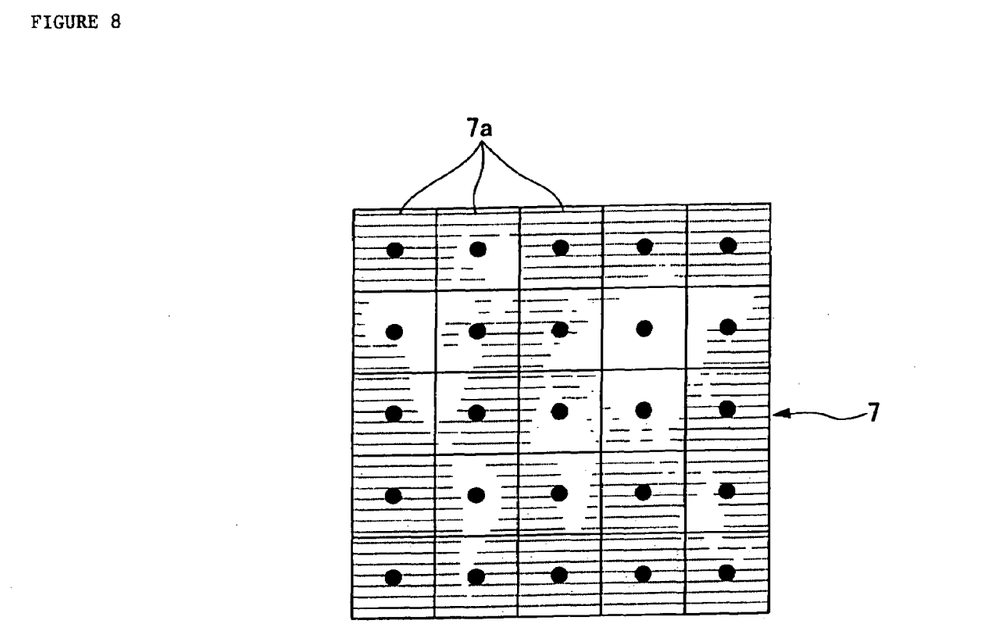
FIG. 8 shows how the pattern in FIG. 7 might be divided into pattern elements.
Figure 9:
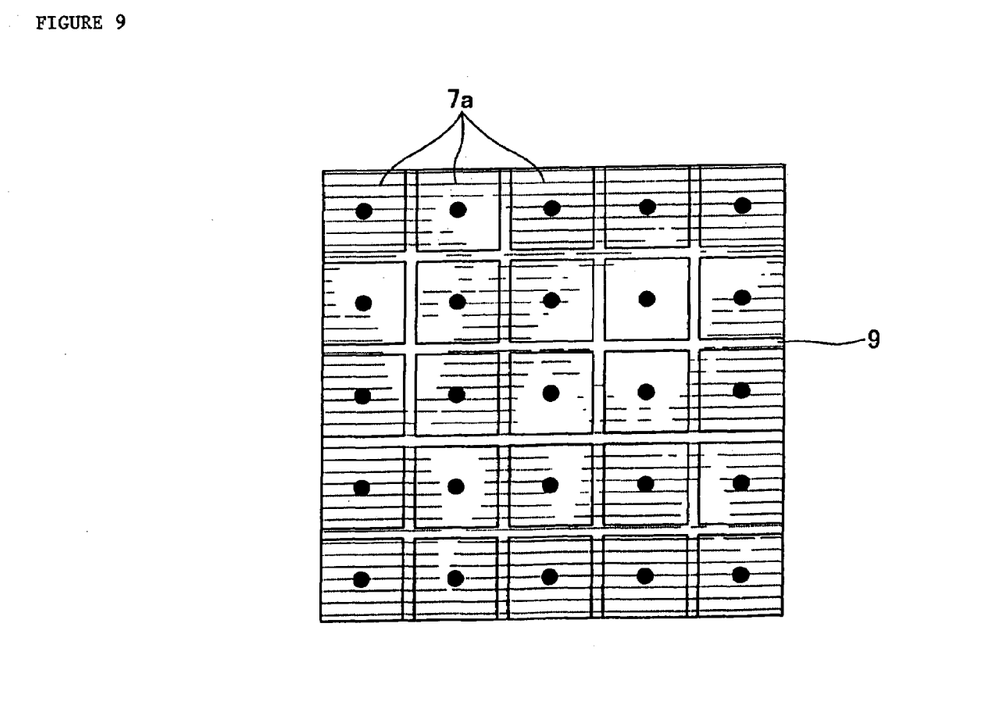
FIG. 9 illustrates how recognition processing could be accomplished using the pattern elements shown in FIG. 8.

The pattern shown in FIG. 7 is continuous, so it would be difficult to divide it along the shapes in the pattern. It could, however, be divided using the mesh pattern in FIG. 8 into twenty-five pattern elements 7a. The black circle in the center of each element 7a marks its center position. If, as is shown in FIG. 9, this pattern is enlarged, pattern elements 7a can all be moved slightly away from each other. The corresponding portions of pattern 9 can then be matched against the pattern elements, and the pattern will be recognized despite the magnification. The image recognition device for this purpose would be configured as in FIG. 1.

The pattern may be divided into elements using schemes other than a mesh. The pattern elements could, for example, be circular, which would make the effect of a change in scale isotropic. However, if the pattern is divided into circular pattern elements which are not overlapped, there will be gaps between the circles. To eliminate these gaps, we can create more elements to overlap the circles and cover these gaps. When overlapping elements are used, the accuracy of matching elements may be affected; however, this is an effective way to deal with a magnified or reduced image, since the overall accuracy will be enhanced. Hexagonal elements, which might be viewed as intermediate between round and square elements, could also be used to create a pattern like a honeycomb. In addition to those mentioned, any number of other shapes could also be used.

Figure 10:
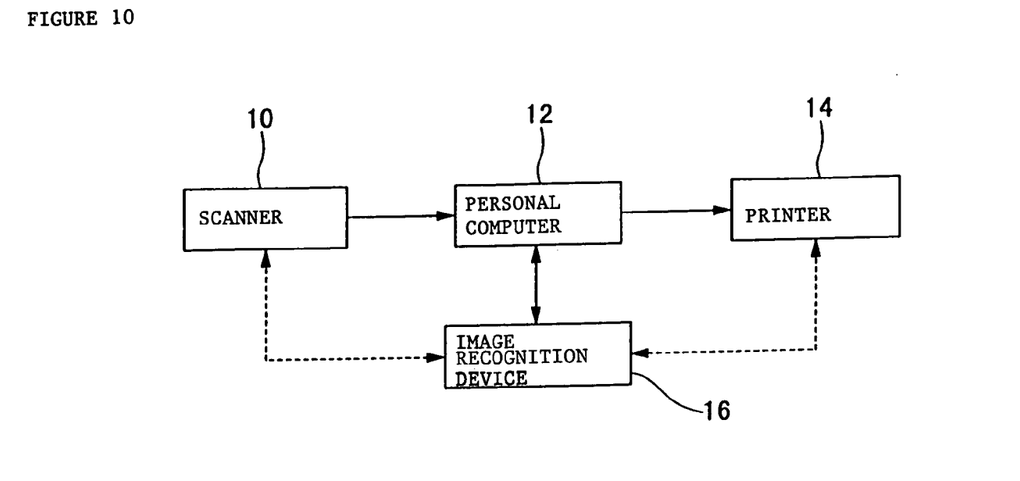
FIG. 10 shows a preferred embodiment of an image processing system containing the image processing device of the present invention.

FIG. 10 illustrates a preferred embodiment of an image processing system comprising an image processing device in accordance with the present invention. As illustrated in FIG. 10, in the image processing system the document is read by a scanner 10, the image input device, and the resulting image data is sent to personal computer 12, the image processing device. Personal computer 12 executes the prescribed processing on the input image data it receives and outputs the processed data to printer 14, the image generating device. Using the data it receives, printer 14 prints an image on the paper and outputs it.

The processing executed by personal computer 12 might include changing the scale of the image, modifying it, correcting its color, or any of a variety of possible operations. The image could also be stored in any of a variety of recording media instead of being sent directly to printer 14. The processing to enlarge or reduce the image need not be limited to personal computer 12. It could also be executed when scanner 10 reads the image or just before printer 14 outputs it. The image input device need not be a scanner. It could also be a digital camera (either still or video) or any of a variety of devices. The scheme used to input the image need not be limited to the use of an image input device like scanner 10, as described above. A recording medium such as floppy disc or magnetic optical disc could also be used, or the image could be inputted electronically.

In this embodiment, image recognition device 16 is connected to personal computer 12. Image recognition device 16 has the configuration shown in FIG. 1. It receives the input image data from personal computer 12 and executes the specified image recognition routine. If it determines that the image data it is processing contains the target image, it sends personal computer 12 a message indicating that result. When it receives such a message, personal computer 12 interrupts its normal image processing. It may simply stop processing the image, or it may reduce the resolution, cause the entire image to be a given color (for example, black), or superimpose an alphanumeric character (i.e., letter) or mark on the image so that anyone can see at a glance that the bill or document is counterfeit or a copy.

As is shown by the dotted lines in the FIG. 10, the result of recognition may be output either to personal computer 12 or to printer 14. Also, personal computer 12 is not the only possible source of the input image data. The input image data may also originate in scanner 10 or printer 14. In case the input image is received from scanner 10, the result of recognition may be sent directly to scanner 10.

Personal computer 12 may have application software to execute the actual image processing. Image recognition device 16 may be a discrete device (including a board) which is attached to personal computer 12, or it may consist of application software installed in personal computer 12. In this case, image recognition device 16 would be built into the personal computer 12 shown in FIG. 10. In an image processing system, image recognition device 16 could be installed in scanner 10 or printer 14 at the user's discretion.

In the discussion above, the arrangement data needed to deal with changes in the scale of the image is stored ahead of time in arrangement data generating unit 4 of FIG. 1. However, the invention is not limited to this scheme only. Alternatively, arrangement data for 100% of original size could be stored, and data for different magnifications could be generated by enlarging or reducing the image as needed for each image presented. The processing to accomplish this magnification or reduction could be also executed by pattern detection unit 3.

In the embodiment discussed above, the program system was stored ahead of time in the personal computer 12, which was treated as a single device. However, the invention is not limited to this case only. There could be an application program which caused the computer to execute all the processing routines, and this program could be stored in a given storage medium.

Figure 11:
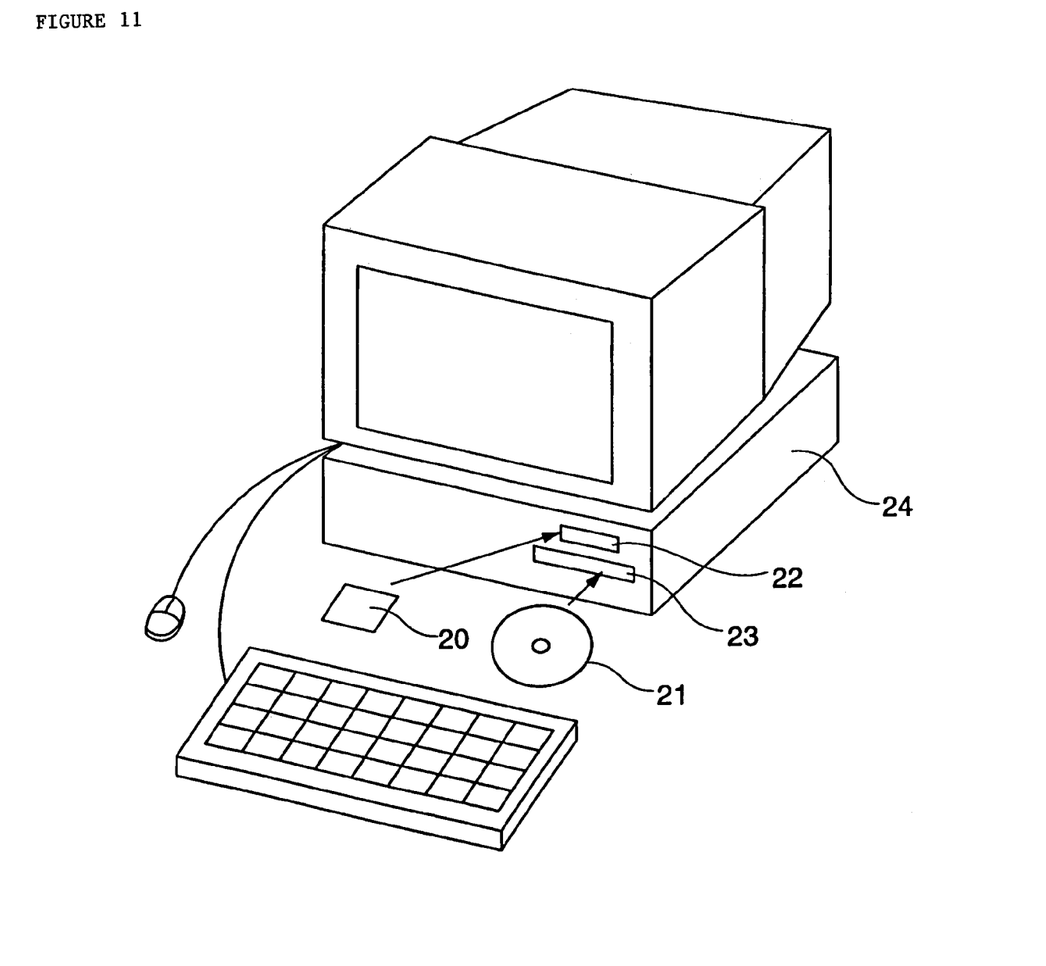
FIG. 11 shows the configuration of a system in which the recording medium of the present invention is implemented.
Figure 12:
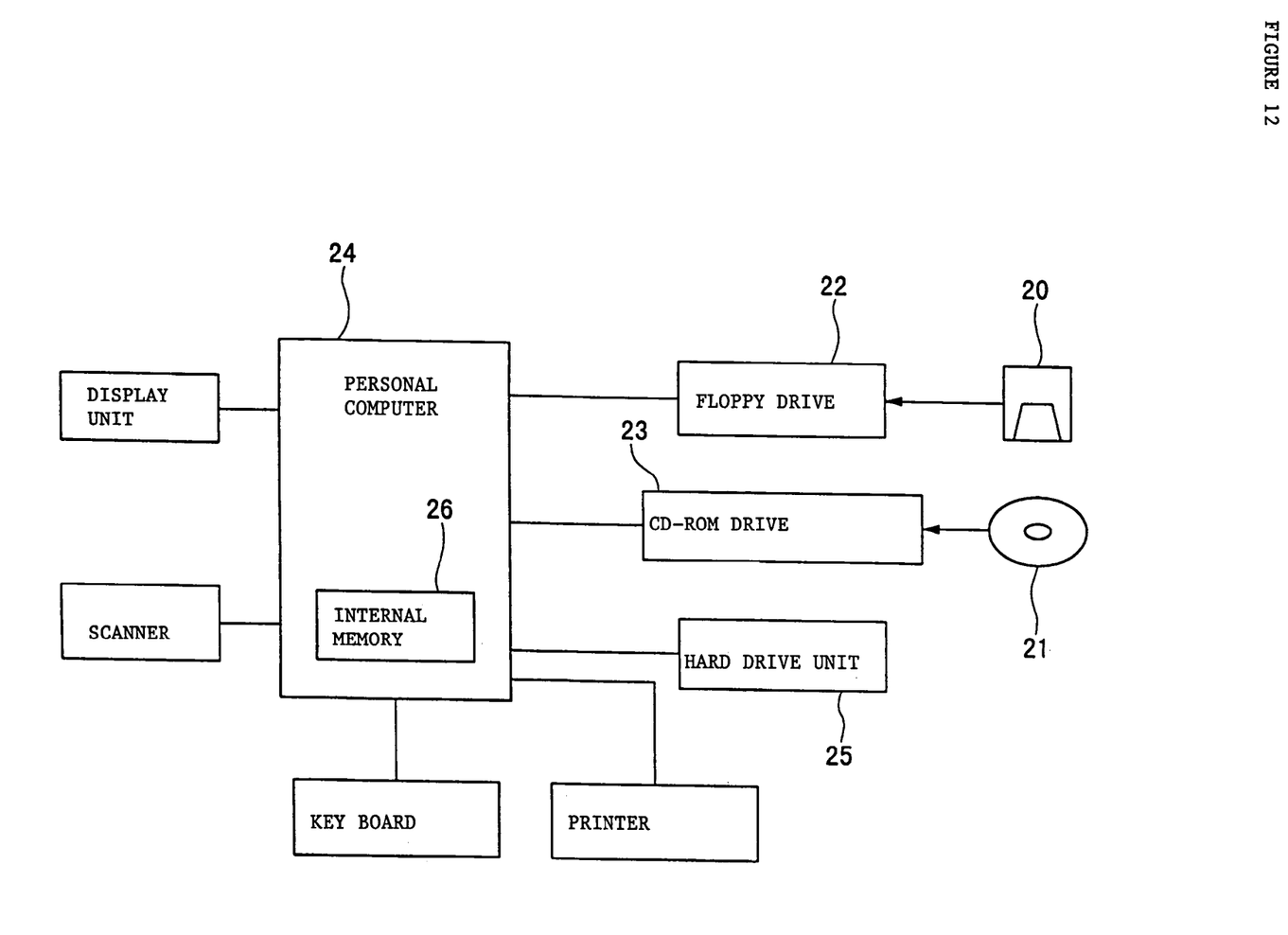
FIG. 12 is a block diagram of the configuration of a system in which the recording medium of the present invention is implemented.

For example, as is shown in FIGS. 11 and 12, floppy disk 20 or CD-ROM 21 could be used as the storage medium. The program stored on storage medium 20 or 21 would then be installed in hard drive unit 25, which is connected to (or installed in) personal computer 24 via floppy drive 22 or CD-ROM drive 23. In addition, personal computer 24 will acquire the configuration discussed in the above embodiment.

In this embodiment of FIG. 12, the matching processing executed in element matching unit 2 and pattern detection unit 3 and the program which detects the center positions and determines the matching of the arrangement data could actually be installed in hard drive unit 25. Then when needed, this functionality could be transmitted from hard drive unit 25 to internal memory 26, where processing units 2 and 3 would be constructed. In this way all the processing could be executed at a high speed. The dictionary data in generating unit 1 and the arrangement data in generating unit 4 could also be stored in hard drive unit 25 or internal memory 26.

If only a basic set of arrangement data is stored in arrangement data generating unit 4 and data is generated anew for each magnified or reduced image, this generating function may be performed by a program which is stored, like processing units 2 and 3 discussed above, on hard drive unit 25. When needed, this program would be transmitted from hard drive unit 25 to internal memory 26.

As is discussed above, the image recognition device, recording medium and image processing device according to this invention can recognize an image which has been distorted so that its size and/or shape differ from the original image. This is performed by dividing the image into smaller elements and comparing each input image element with the corresponding element of a target pattern. This approach absorbs the differences in size and shape and thus allows the distorted image to be recognized. In addition to the data for each element of the image, data concerning the relative arrangement of the elements is also considered in the final determination of whether the input image data contains the target image. This use of relative position data effectively minimizes any detrimental effect the scheme might have on recognition rate.

While certain embodiments of the invention have been described and illustrated above, the invention is not limited to these specific embodiments as numerous modifications, changes and substitutions of equivalent elements can be made without departing form the spirit and scope of the invention. Accordingly, the scope of the present invention is not to be considered as limited by the specifics of the particular structures which have been described and illustrated, but is only limited by the scope of the appended claims.

What is claimed as new and desired to be protected by Letters Patent of the United States is:

1. An image recognition device, for detecting arbitrary images, comprising:
    an element matching means arranged and configured to match an input image with target pattern elements obtained by dividing a target pattern into a plurality of target pattern elements along the shapes in the target pattern; and
    a pattern detection means arranged and configured to recognize whether said input image includes said target pattern by comparing position data of matching pattern elements output by said element matching means with multiple magnification reference arrangement data of each of said target pattern elements;
wherein said multiple magnification reference arrangement data corresponds to magnification levels no greater than a level at which a human eye can readily distinguish between an original and a non-zero magnification of the original.

2. The image recognition device of claim 1, wherein said position data comprises the center point of each matching pattern element output by said element matching means.

3. The image recognition device of claim 1, wherein each of said multiple magnification reference arrangement data corresponds to a magnification level no greater than approximately 15%.

4. An image recognition device, for detecting arbitrary images, comprising:
    a dictionary generating unit arranged and configured to store dictionary data for each of a plurality of target pattern elements obtained by dividing a target pattern along the shapes in the target pattern;
    an element matching unit arranged and configured to match an input image against said dictionary data stored in said dictionary generating unit;
    an arrangement data generating unit which stores position data representing an arrangement of each of the target pattern elements at a plurality of magnifications, each of said plurality of magnifications being no greater than a level where a human eye can readily distinguish between an original and a non-zero magnification of the original; and
    a pattern detection unit which, based on the output of said element matching unit and said position data from said arrangement data generating unit, determines whether said target pattern can be found in said input image.

5. The image recognition device of claim 4, wherein said dictionary generating unit comprises a software routine.

6. The image recognition device of claim 4, wherein said element matching unit comprises a software routine.

7. The image recognition device of claim 4, wherein said arrangement data generating unit comprises a software routine.

8. The image recognition device of claim 4, wherein said pattern detection unit comprises a software routine.

9. The image recognition device of claim 4, wherein each of said plurality of magnifications is no greater than approximately 15%.

10. An image processing device comprising:
    an element matching means to match an input image with target pattern elements obtained by dividing a target pattern into a plurality of target pattern elements along the shapes in the target pattern;
    a pattern detection means to recognize whether said input image includes said target pattern by comparing position data of matching pattern elements output by said element matching means with multiple magnification reference arrangement data of each of said target pattern elements,
    wherein said multiple magnification reference arrangement data corresponds to magnification levels no greater than a level at which a human eye can readily distinguish between an original and a non-zero magnification of the original; and
    a control means to control output of said input image to an output device when said pattern detection means recognizes said input image includes said target pattern.

11. The image processing device of claim 10, wherein said output device comprises a printer.

12. The image processing device of claim 10 further comprising a scanner to input said input image into said image processing device.

13. The image processing device of claim 10 further comprising a digital camera to input said input image into said image processing device.

14. The image processing device of claim 10 further comprising a floppy disc to input said input image into said image processing device.

15. The image processing device of claim 10 further comprises a personal computer to facilitate copying of said input image.

16. The image processing device of claim 10, wherein each of said multiple magnification reference arrangement data corresponds to a magnification level no greater than approximately 15%.

17. The image processing device of claim 10, wherein said position data comprises the center point of each matching pattern element output by said element matching means.

18. A computer-readable medium containing computer code for implementing an image recognition method for detecting arbitrary images said computer-readable medium comprising:
    a storage area having stored thereon a computer code, said computer code comprising:
        an element matching means arranged and configured to match an input image with target pattern elements obtained by dividing a target pattern into a plurality of target pattern elements along the shapes in the target pattern; and
        a pattern detection means executable by said computer causing said computer to recognize whether said input image includes said target pattern by comparing position data of matching pattern elements output by said element matching means with multiple magnification reference arrangement data of each of said target pattern elements;

wherein said multiple magnification reference arrangement data corresponds to magnification levels no greater than a level where a human eye can readily distinguish between an original and a non-zero magnification of said original.

19. The computer-readable medium of claim 18, wherein each of said multiple magnification reference arrangement data corresponds to a magnification level no greater than approximately 15%.

20. The computer-readable medium of claim 18, wherein said position data comprises the center point of each matching pattern element output by said element matching means.

21. A method of processing an image, said method comprising:

dividing a target pattern into a plurality of target pattern elements along the shapes in the target pattern, said target pattern being an arbitrary pattern;

determining reference arrangement data for each of said target pattern elements at a plurality of magnifications, said plurality of magnifications being no greater than a level where a human eye can readily distinguish between an original and a non-zero magnification of said original;

inputting data for an input image;

matching said input image with said target pattern elements to determine whether said target pattern elements can be found in said input image; and comparing position data of target pattern elements found in said matching with said reference arrangement data to determine whether said input image includes said target pattern.

22. The method of claim 21, further comprising halting if said input image includes said target pattern.

23. The method of claim 21 further comprising changing the color of a reproduction of said input image if said input image includes said target pattern.

24. The method of claim 21 further comprising reducing the resolution of a reproduction of said input image if said input image includes said target pattern.

25. The method of claim 21 further comprising superimposing an alphanumeric character on top of a reproduction of said input image if said input image includes said target pattern.

26. The method of claim 21, wherein each of said plurality of magnifications is no greater than approximately 15%.

27. The method of processing an image of claim 21, wherein said position data comprises the center point of each target pattern element found in said matching.

* * * * *